US012320655B2

(12) United States Patent
Varisco et al.

(10) Patent No.: US 12,320,655 B2
(45) Date of Patent: Jun. 3, 2025

(54) DEVICE FOR CALCULATING DRIVING ROUTES FOR USE IN A MOTOR VEHICLE AND METHOD FOR CALCULATING DRIVING ROUTES

(71) Applicant: FERRARI S.P.A., Modena (IT)

(72) Inventors: Stefano Varisco, Modena (IT); Andrea Secondi, Modena (IT)

(73) Assignee: FERRARI S.p.A., Modena (IT)

( * ) Notice: Subject to any disclaimer, the term of this patent is extended or adjusted under 35 U.S.C. 154(b) by 127 days.

(21) Appl. No.: 18/330,075

(22) Filed: Jun. 6, 2023

(65) Prior Publication Data

US 2023/0400313 A1 Dec. 14, 2023

(30) Foreign Application Priority Data

Jun. 8, 2022 (IT) .......................... 102022000012131

(51) Int. Cl.
*G01C 21/34* (2006.01)
(52) U.S. Cl.
CPC ................................ *G01C 21/3446* (2013.01)
(58) Field of Classification Search
None
See application file for complete search history.

(56) References Cited

U.S. PATENT DOCUMENTS

| 2008/0004797 | A1 | 1/2008 | Katzer | |
|---|---|---|---|---|
| 2011/0231086 | A1* | 9/2011 | Montealegre | ...... G01C 21/3461 701/532 |
| 2015/0066355 | A1* | 3/2015 | Siegel | ................ G01C 21/3492 701/410 |
| 2015/0308845 | A1 | 10/2015 | Ding | |
| 2015/0345958 | A1* | 12/2015 | Graham | ................ B60W 50/00 701/22 |
| 2018/0080785 | A1 | 3/2018 | Han et al. | |
| 2018/0172464 | A1* | 6/2018 | Sekizawa | ............. G06V 40/174 |
| 2020/0363222 | A1 | 11/2020 | Feiling et al. | |
| 2021/0389144 | A1* | 12/2021 | Kim | .................... G01C 21/3691 |
| 2022/0221292 | A1* | 7/2022 | Putnam | .................. G06N 20/00 |

OTHER PUBLICATIONS

Italian Search Report for Application No. 102022000012131; Filing Date: Jun. 8, 2022; Date of Mailing—Jan. 17, 2023, 8 pages.

* cited by examiner

*Primary Examiner* — Ryan Rink
(74) *Attorney, Agent, or Firm* — CANTOR COLBURN LLP

(57) ABSTRACT

A method to calculate a driving route includes the steps of acquiring information corresponding to a departure place of the motor vehicle and to a target destination, determining a road map comprising a departure point and an arrival point of the driving route associated with the departure place and with the destination, respectively, calculating the driving route on the road map from the departure point to the arrival point by solving a path planning problem comprising an optimization of a target function depending on at least one first scalar parameter defined by a fun index, wherein the fun index is indicative of a level of fun of the driving route and wherein the target function strays away from an optimum value thereof when the fun index indicates a deviation of the level of fun from a target level or a decrease in the level of fun, the optimum value of the target function corresponding to the solution of the path planning problem.

14 Claims, 2 Drawing Sheets

DEVICE FOR CALCULATING DRIVING ROUTES FOR USE IN A MOTOR VEHICLE AND METHOD FOR CALCULATING DRIVING ROUTES

CROSS-REFERENCE TO RELATED APPLICATIONS

This patent application claims priority from Italian patent application no. 102022000012131 filed on Jun. 8, 2022, the entire disclosure of which is incorporated herein by reference.

FIELD OF THE ART

The invention concerns a device for calculating driving routes for use in a motor vehicle, as well as a method to calculate driving routes.

PRIOR ART

As is known, the market has numerous solutions of satellite navigation systems for motor vehicles based on navigation programs installed on fixed devices to the motor vehicles or even on mobile devices, such as mobile phones.

Navigation programs are normally configured to calculate a driving route that can be covered by a motor vehicle between two points, that is, between a departure point and an arrival or destination point.

Typically, the driving route is calculated in an optimized way with respect to parameters such as the overall length of the route or an expected travel time of the route.

In other words, the navigation program may for example calculate the shortest driving route in terms of length or the fastest driving route in terms of time.

The prediction of the travel time normally takes place as a function of the average expected speed of the motor vehicle along the driving route and optionally as a function of the additional information, including for example information relating to the road traffic conditions, the residual range of the motor vehicle, the speed limits imposed by law, the presence of road maintenance works, the presence of mandatory deviations, etc.

The additional information can typically be retrieved by the satellite navigation system by connection to specific servers or databases containing the information according to standard communication protocols, such as for example the ADASIS protocol.

To calculate the driving route, the navigation program uses a stored map and comprising the departure point and the arrival point. The map can be retrieved from specific servers or updated through information contained in the same servers.

The communication between the latter servers and the navigation system on which the navigation program is installed can still take place according to the standard communication protocols, such as the ADASIS protocol.

The map is processed as a graph consisting of a plurality of nodes or vertices representing intersections between roads and of a plurality of edges or sides that connect the nodes to each other and represent the roads between the intersections, respectively.

The navigation program associates with each of the sides a corresponding weight, which is an increasing scalar function of one or more optimization parameters, including an estimated length or travel time of the side.

Thus, the driving route is calculated as the route along the graph corresponding to the minimum of the sum of the weights of the sides belonging to the route. This route is normally referred to as the shortest path between the departure point and the arrival point.

Therefore, the calculation of the driving route corresponds to the minimization of a cost function or target function corresponding to the sum of the weights of the covered sides on the graph.

The calculation can take place according to any one of a plurality of well-known algorithms, such as for example the Dijkstra algorithm or the A* algorithm or algorithms based on the contraction of hierarchies.

The calculated driving route is shown to a user, i.e. specifically a driver of the motor vehicle, via a screen of the satellite navigation system.

In some cases, the navigation program also provides suboptimal alternative driving routes presented to the user via the screen. For example, an alternative driving route can be determined by re-running the cost function minimization after excluding the optimal driving route from the graph.

Normally, the user can choose the preferred driving route from those calculated by the navigation program and follow it by driving the motor vehicle accordingly.

In this way, the satellite navigation system and the navigation program decisively influence the actual route followed by the motor vehicle, thus influencing consequently the energy consumptions, the time taken to reach the destination, as well as the driving pleasure of the user.

In fact, different routes travelled by the motor vehicle correspond to different stresses on the suspensions or on the brakes of the motor vehicle, different lateral accelerations, different traffic or road surface conditions, different differences in height to be covered, etc.

For example, a route with multiple curves will be slower than a route with multiple straight roads, but the driver will feel more fun due to the lateral accelerations associated with the curves, with benefit in the driving pleasure of the motor vehicle.

In general, or more specifically in the field of sports motor vehicles, there is the need to increase the driving pleasure of the driver, preferably without excessive energy waste and/or losses of time for the driver.

An aim of the invention is to satisfy the above requirement, preferably in a simple and reliable manner.

DISCLOSURE OF THE INVENTION

The aim is achieved by a method to calculate a driving route for a motor vehicle and by a device for calculating driving routes as defined in the independent claims.

The dependent claims define particular embodiments of the invention.

BRIEF DESCRIPTION OF THE DRAWINGS

In the following, an embodiment of the invention is described for a better understanding thereof by way of non-limiting example and with reference to the accompanying drawings in which.

EMBODIMENTS OF THE INVENTION

Figure 1:
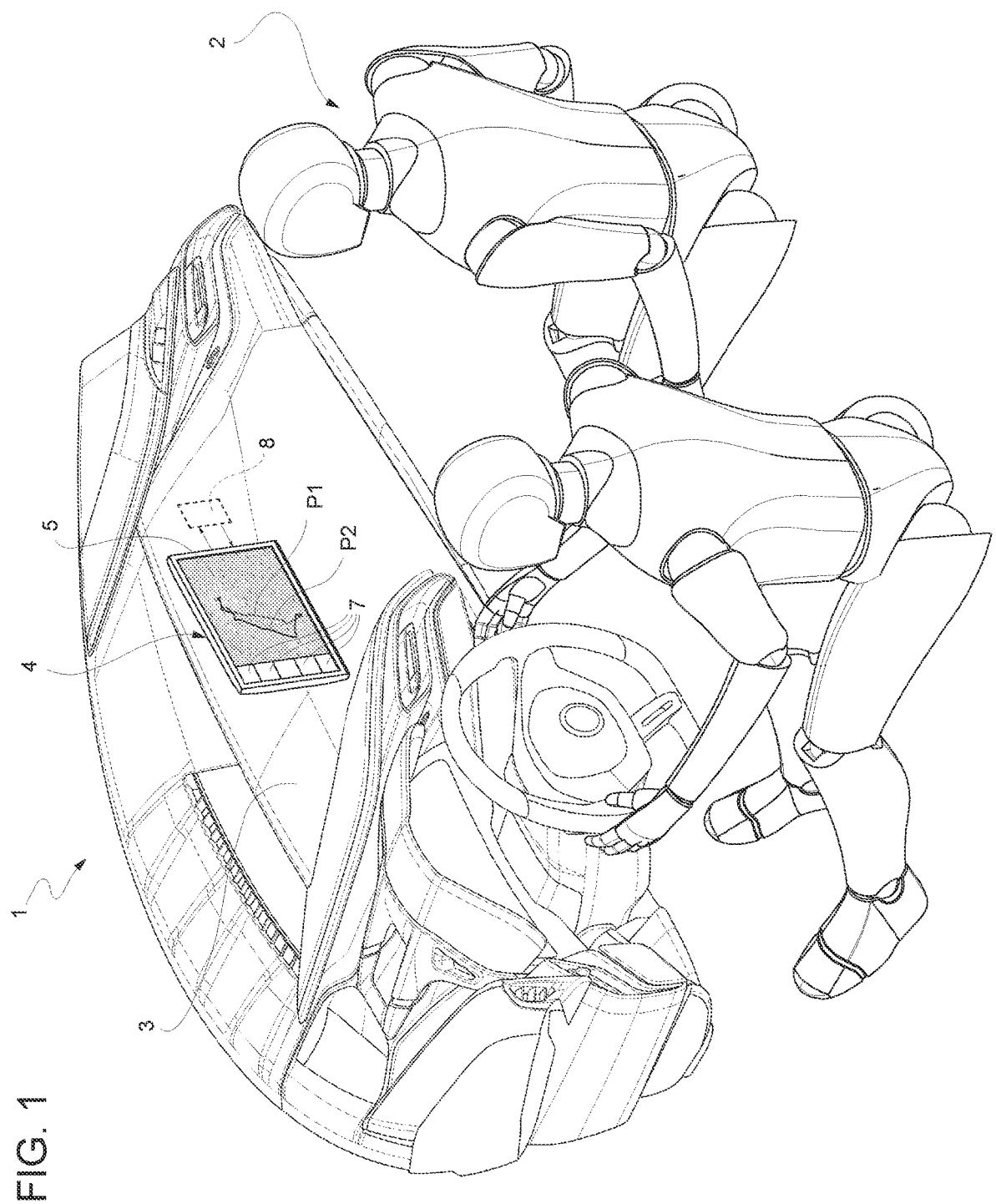
FIG. 1 is a perspective view of a passenger compartment of a motor vehicle comprising a device for calculating the driving route according to the invention.

In FIG. 1, the reference number 1 is used to denote, as a whole, a motor vehicle.

The motor vehicle 1 has a passenger compartment 2 to accommodate a driver and one or more passengers.

Preferably, the motor vehicle 1 is of the hybrid or electric type rechargeable by connection to an electrical outlet; this represents a non-limiting example, since the motor vehicle 1 could have any type of fuel, for example a common fossil fuel, more precisely petroleum-based.

Inside the passenger compartment 2, the motor vehicle 1 comprises a dashboard or instrument panel 3 and a calculation device 4, in particular an on-board computer, fixedly mounted on the dashboard 3, specifically in a position such as to be visible by the driver and more specifically also by one of the passengers sitting next to the driver.

This is optional, as the device 4 could have been a mobile device, for example a tablet or a mobile phone.

The device 4 comprises a screen 5, for example of the touchscreen type, configured to depict a representation of a road map 6. Furthermore, the device 4 comprises a plurality of commands 7, for example in the form of physical buttons or virtual buttons depicted on the screen 5, configured to allow the driver or the passenger to enter data or information of various kind on the device 4. The commands 7 may also include voice type commands or mechanisms of various kind, such as levers, rods, sliding handles, and the like, as well as virtual keyboards.

The device 4 is for example part of a satellite navigation system or of a satellite navigation system for assisting the driver in driving the motor vehicle 1 through the places represented by the map 6. The navigation system includes a GPS receiver connected to the device 4, such that the device 4 can receive from the GPS receiver a GPS signal and identify the position of the motor vehicle 1 on the map 6 based on the GPS signal.

The device 4 comprises a data processing unit 8 configured to calculate driving routes that can be followed by the motor vehicle 1. The unit 8 calculates the driving routes on the map 6.

In FIG. 1, the screen 5 shows specifically a main route P1 and an alternative route P2 for reaching a target destination starting from a departure place, at least approximately. Without any loss of generality, the departure place could also correspond to the current position of the motor vehicle 1 on the map 6, or it could correspond to a choice or preference of the driver. The destination or arrival place corresponds to a choice or preference of the driver, or may optionally be determined by the device 4 arbitrarily or based on various criteria.

The routes P1, P2 are calculated according to different criteria, as will be clearer from the following. The unit 8 and the screen 5 can actually calculate and respectively show other routes besides the routes P1, P2, as will be clearer from the following.

In general, the unit 8 is configured to acquire information corresponding to the departure place and the destination.

For example, the unit 8 may acquire the information on the departure place from the GPS signal when the departure place coincides with the current position of the motor vehicle 1 or is based on the current position itself. Alternatively, the information acquired on the departure place may correspond to inputs from the driver via the commands 7 or to data coming from other electronic devices or stored on the unit 8, for example data from a virtual log. Similarly, for example, the information on the destination may correspond to inputs from the driver via the commands 7 or to data stored on the unit 8, for example data from a virtual log, or to data from other electronic devices.

The map 6 is determined by the unit 8 so as to comprise a departure point S and an arrival point Y respectively associated with the departure place and the destination.

Specifically, the unit 8 may store a plurality of maps respectively relating to different geographical areas of the world. Thus, the unit 8 can select the map 6 comprising the departure point S and the arrival point Y. Alternatively or additionally, the unit 8 may acquire and optionally store one or more maps, including the map 6 comprising the departure point S and the arrival point Y from external sources to which the device 4 is connected, for example via wireless connections or more precisely via the internet, in particular according to a standardised protocol such as the ADASIS protocol. Alternatively or additionally, the stored maps can be updated by the unit 8, optionally in real time, using information acquired from the external sources.

Henceforth, the so-called external sources may include a data cloud, servers or public or private databases accessible by the device 4, for example via wireless or Bluetooth connection, as well as the internet network and devices readable by the device 4, such as USB sticks and the like.

In general, the departure point S and the arrival point Y could coincide with the departure place and with the destination respectively, but this is not necessary. In fact, for example, the map 6 could not include exactly the departure place or the destination; in this case, the departure point S and the arrival point Y could be the points belonging to the map 6 closest to the departure place and to the destination, respectively.

Figure 2:
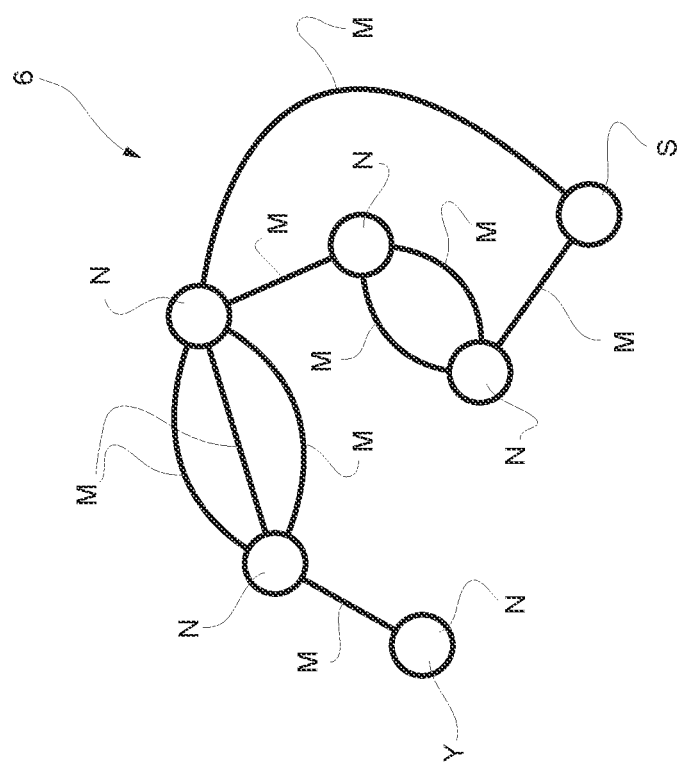
FIG. 2 represents a schematization of a road map in the form of a graph.

Preferably, but not necessarily, the map 6 is processed or stored by the unit 8 as a graph, for example like the exemplary one of FIG. 2.

Specifically, the graph of FIG. 2 represents the map 6 and comprises a plurality of nodes N and a plurality of edges or links M. Each of the nodes N represents an intersection between roads or a specific point of a road. Each of the edges M connects two corresponding nodes N and represents a section of road between the two corresponding nodes N.

The departure point S and the arrival point Y correspond to two respective nodes N of the map 6.

The unit 8 calculates the route P2 and preferably the route P1 on the map 6 between the departure point S and the arrival point Y. In other words, the unit 8 calculates the routes P1, P2, under the constraint that the departure point S and the arrival point Y are respectively the starting and final point of the routes P1, P2.

Each of the routes P1, P2 is independently defined in the specific example of FIG. 2 by a particular sequence of edges M.

In this sense, each edge M can be considered as a Boolean variable that assumes a first value when the edge M belongs to one of the routes P1, P2 and a second value different from the first when the edge M does not belong to the same one of the routes P1, P2.

The unit 8 is configured to calculate the route P2 on the map 6 from the departure point S to the arrival point Y by solving a path planning problem comprising an optimization of a target function depending on a scalar parameter defined by a fun index. Here, the term optimization refers to the mathematical meaning of minimization or maximization, relative or absolute, of the target function.

When the target function is optimized, the target function itself assumes an optimum value, that is, a minimum value or a maximum value. The value assumed by the target function depends on the fun index. The optimum value corresponds to the solution of the path planning problem.

The fun index is indicative of a level of fun of the driving route. In particular, the fun index increases with the level of fun experienced by the driver, although this is not necessary. In fact, the fun index is a conventional index, so it could conventionally decrease with the level of fun while remaining indicative of the same.

The target function strays away from the optimum value the more the fun index indicates a deviation of the level of fun from a target level or a decrease in the level of fun.

The level of fun can generally be understood as increasing with that greater sense of enjoyment and satisfaction experienced by the driver when the route requires more concentration or more technical competence in driving the motor vehicle 1, and/or when the route crosses panoramic places, and/or when the route avoids slowdowns due to, for example, queues, traffic lights and other situations commonly recognized as tedious by the drivers.

Therefore, the level of fun increases with any one or more of
- a first quantity positively correlated with lateral accelerations of the motor vehicle expected along the route P2,
- a second quantity positively correlated with front accelerations of the motor vehicle expected along the route P2,
- a third quantity positively correlated with slope variations expected along the route P2,
- a fourth quantity negatively correlated with decelerations of the motor vehicle expected along the route P2, and
- a fifth quantity negatively correlated with transits through urban sections or centres expected along the route P2.

More precisely, the first quantity can be a number A of lateral accelerations or of curves with lateral accelerations higher than a first threshold, for example defined by the unit 8, possibly based on information entered by the driver via the commands 7 or for example acquired from the external sources. The prediction of lateral accelerations can take place based on the conformation of the route P2 and on the habits of the driver or on the speed limits, for example stored in the unit 8 or acquired from external sources or entered by the driver via the commands 7.

The lateral accelerations are indicative of the amount and narrowness of the curves; in fact, many curves and/or narrow curves increase the driving fun or the pleasure of the driver.

Furthermore, the second quantity can be a number B of frontal accelerations higher than a second threshold, for example defined by the unit 8, possibly based on information entered by the driver via the commands 7 or for example acquired from the external sources. The prediction of the frontal accelerations can take place based on the conformation of the route P2 and based on the habits of the driver or on the speed limits, for example stored in the unit 8 or acquired from external sources or entered by the driver via the commands 7.

The frontal accelerations are indicative of the presence of straight roads following a lowering of speed, for example due to a curve. This typically increases the driving pleasure or the fun of the driver.

Furthermore, the third quantity can be a number C of ascents and/or descents with relative slopes higher than a third threshold, for example expressed as a percentage and/or defined by the unit 8, possibly based on information entered by the driver via the commands 7 or for example acquired from the external sources. The prediction of the slope variations can take place based on the conformation of the route P2.

The slope variations are for example indicative of panoramic routes. The panoramic routes typically increase the driving pleasure or the fun of the driver.

Furthermore, the fourth quantity can be a number D of decelerations or brakings with decelerations lower than a fourth threshold, for example defined by the unit 8, possibly based on information entered by the driver via the commands 7 or based on other criteria, for example acquired from the external sources. The prediction of the decelerations can take place based on the conformation of the route P2 and based on the habits of the driver or on the speed limits, for example stored in the unit 8 or acquired from external sources or entered by the driver via the commands 7.

The presence of sudden decelerations is for example an indication of a poor sinuosity of the route, which negatively affects the driving pleasure or the fun of the driver.

In addition, the fifth quantity can be a number E of crossed population centres, wherein for example the information on number E is acquired from the external sources.

Clearly, the population centres normally involve slowdowns, presence of traffic and of traffic lights, so population centres have a negative impact on the driving pleasure or on the fun of the driver.

Preferably, the numbers A, B, C, D, E are stored by the unit 8. Similarly, although independently, each of the thresholds may be stored in the unit 8. Each of the thresholds can be chosen arbitrarily or for example based on common habits, for example identified through surveys.

Each of the quantities from the first to the fifth can be acquired or determined by the unit 8 based on the reception of signals or information coming from transducers of the motor vehicle 1, for example with regard to the accelerations and the decelerations, and/or from the external sources, for example with regard to the slope variations, the population centres, the conformation of the route P2, the habits of the driver. Alternatively or additionally, each of the quantities from the first to the fifth can be acquired or determined by the unit 8 based on relative data stored in the unit 8, for example with regard to the slope variations, the population centres, the conformation of the route P2, the habits of the driver.

The unit 8 may be configured to calculate the fun index based on one or more of the acquired quantities or determined from the first to the fifth. Alternatively, the unit 8 may also directly acquire or determine the fun index in association with each edge M or with the entire route P2, for example from the external sources or from data stored by the unit 8.

In particular, the fun index can be calculated as a combination, more in particular linear, of all or some of the quantities from the first to the fourth.

For example, the fun index can be calculated using the following formula:

$$Aa+Bb+Cc+Dd-Ee,$$

where a, b, c, d, e are weights, for example scalar, in particular constant. The weights can be stored by the unit 8.

The calculation of the fun index or the formula can be normalized on the length of the route P2, for example expressed in kilometres.

The fun index can be calculated for each edge M or for the entire route P2, for example as a sum, optionally weighed, of the fun indices calculated for each edge M. These latter fun indices can be considered as intermediate fun indices, unlike the overall fun index associated with the entire route P2.

In greater detail, the target function has one or more optimization variables whose respective values are suited to determine the route P2 and correspond to at least one value of the fun index in the target function.

The path planning problem is solved by respective optimum values of the optimization variables corresponding to the route P2 and to at least one optimum value of the fun index associated with the route P2 and optimizing the target function.

According to a first example, each of the edges M of the graph is associated, i.e. corresponds to a weight as a function of the fun index.

The edges M of the graph define respectively the optimization variables of the target function, where the same variables can be considered as Boolean variables as mentioned above. Therefore, the set of the values assigned to all Boolean variables, in particular suitably ordered so as to form a sequence, determines the route P2 in a unique manner.

The target function can be the sum of the weights, for example weighed, of the edges M belonging to the route P2.

In this way, since each weight is a function of the fun index, in particular of the intermediate fun index calculated for the single edge M, the value of the target function is a function of the fun index. This latter function of the fun index is characteristic of the particular route P2 determined by the values of the optimization variables.

In fact, in turn, the value or the values of the fun index in the target function, for example the values of the intermediate fun indices calculated for the respective edges M, will correspond to the route P2 determined by the values of the optimization variables and therefore will correspond to the latter values.

Therefore, the optimum values of the optimization variables correspond to the optimum route P2 and at the same time to optimum values of the fun index, for example the values of the intermediate fun indices calculated for the edges M of the optimum route P2, such that also the value of the target function is optimized.

More precisely, according to a simple variant of the first example, the weight of each edge M coincides with the intermediate fun index calculated for the corresponding edge M. Here, preferably, the target function comprises the sum, weighed or not, of the intermediate fun indices. When the sum is not weighed, i.e. when the sum is arithmetic, the target function comprises the overall fun index for the entire route P2. In this way, the values of the optimization variables correspond to a single value of the fun index, precisely of the overall fun index.

In this variant, the optimization of the target function corresponds to the maximization of the target function itself. Clearly, this is not essential; in fact, the weights could have coincided with the reciprocals of the intermediate fun indices. In this case, the optimization of the target function would have corresponded to the minimization of the same target function, here defining a cost function.

If, for example, the target function was defined by the overall fun index, the target function would stray away from the optimum value, that is, from the maximum value, when the overall fun index decreases, that is, when the fun index indicates a decrease in the level of fun. However, this is a non-limiting example. In fact, the target function could comprise in addition to the overall fun index a penalty contribution, which decreases the value of the target function when the overall fun index strays away from a target value corresponding to a target level of fun. For example, the penalty contribution can be a non-zero negative function only when the value of the overall fun index lies outside a target range. In this way, the search for a route P2 that guarantees a target level of fun can be achieved. Clearly, this particular example expresses a general concept that can be applied to any variant of the first example, i.e. the concept of adding suitably designed penalty contributions within the target function to obtain a route P2 with a target level of fun. More precisely, the penalty contribution penalizes the target function when the fun index or one or more values thereof lie outside a predetermined target range.

Obviously, the fact that the optimization corresponds to the minimization or to the maximization of the target function also depends on the formulation itself of the calculation of the value or of the values of the fun index and also on how the weights are a function of that value or those values. Following this explanation, the person skilled in the art is able to autonomously identify multiple variants according to the purposes of the optimization, which is however based on the fun index, with a view to maximizing the level of fun or reaching the target level of fun.

According to a further variant of the first example, the target function further depends on at least one further parameter indicative of a duration, a length, or a residual range to be used expected by the route P2.

In fact, the target function could depend on a plurality of additional parameters, each of which can independently be indicative of the duration, length, or residual range to be used expected by the route P2.

The target function strays away from its optimum value when the further parameter or each of the parameters indicates an increase in the duration, the length, or the residual range to be used expected by the route P2.

For example, each of the weights of the edges M may be a combination, in particular linear, of the value of the further parameter for the corresponding edge M and of the reciprocal of the value of the intermediate fun index for the edge M or alternatively of the reciprocal of the value of the further parameter and of the value of the intermediate fun index. In the two alternative cases, the optimization will correspond respectively to the minimization and maximization of the target function.

In particular, the combination, more in particular linear, may extend to all additional parameters.

According to a second example, the unit 8 is configured to calculate a plurality of candidate routes alternative to one other according to known methodologies.

Therefore, the values of the optimization variables are the candidate routes themselves. In fact, each of the candidate routes corresponds to at least one value of the fun index, in particular the value of the overall fun index for the candidate route.

The target function may be a function of the overall fun index corresponding to the value of the optimization variable, i.e. to one of the candidate routes.

In particular, the target function could also coincide with the overall fun index corresponding to the value of the optimization variable or be a combination, in particular linear, of a function of the overall fun index corresponding to the value of the optimization variable and of one or more among the aforementioned additional parameters.

On the other hand, the route P1 is calculated by the unit 8 differently with respect to the route P2; for example, the route P1 is calculated according to known optimization methods or more precisely by minimizing a cost function with respect to one or more parameters between the duration, the length and the residual range to be used expected. In other words, the route P1 is an optimum route according to common criteria that do not involve or contemplate the fun index.

Therefore, in particular, the route P1 represents a shortest path according to the common technical meaning of the latter term in the field of route research.

In other words, the unit 8 is configured to calculate the route P1 as a shortest path on the map 6 from the departure point S to the arrival point Y as a solution of a minimization of a cost function comprising one or more cost parameters that can be assigned to the shortest path.

Each cost parameter may be defined by, for example, a duration, a length, a residual range to be used, or a linear or non-linear combination of two or more of them.

Each cost parameter can also be clearly assigned to the route P2. In fact, also the route P2 will have a specific duration and length and will involve a residual range to be used.

Optionally, the unit 8 may calculate many other driving routes in addition to the routes P1, P2. In particular, the unit 8 can calculate a plurality of alternative routes that are suboptimal with respect to the route P2 based on the fun index, for example according to processes analogous to that for calculating the route P2, wherein the route P2 is specifically excluded, for example removed from the graph or from the optimization variables respectively according to the first and second example described above.

Preferably, the unit 8 is configured to determine a current residual range of the motor vehicle 1. For example, the residual range corresponds to an estimate of the kilometres that can be covered by the motor vehicle 1. In particular, the residual range may correspond to the residual charge of a battery of the motor vehicle 1 or to the amount of fuel contained in a tank of the motor vehicle 1, and the like.

The unit 8 is configured to calculate the route P2 only when the determined current residual range is insufficient to cover the route P1, more precisely without stops to raise the level of current residual range, for example stops at a charging station or at a fuelling station. Alternatively, the unit 8 can calculate the route P2 and provide it in output, for example to the driver, in particular via the screen 5, only when the determined current residual range is insufficient to cover the route P1.

Actually, the need to make stops along the route P1 compromises the convenience of the route P1 in the classic terms of duration. Therefore, the opportunity of covering the more fun route P2 becomes tempting, especially if the route P2 does not require stops.

Furthermore, the unit 8 is preferably configured to estimate whether the current residual range is sufficient to cover the route P2.

In the positive case, the unit 8 can provide in output, for example to the driver, specifically via the screen 5, the route P2, in particular if the current residual range is insufficient to cover the route P1.

In the negative case or more precisely only in the negative case, independently of the positive case, the unit 8 is preferably configured to determine whether there is at least one point of the route P2, for example a node N, from which a residual range charging station on the map 6 has a distance, for example in terms of time or space, smaller than a predetermined threshold.

The predetermined threshold can be determined arbitrarily by the unit 8, for example on the basis of an appropriate criterion, or set by the driver, for example via the commands 7.

For clarity's sake, the term distance is to be interpreted with its broadest meaning, in particular including the time needed to reach the station from the point of the route P2 and the length of the deviation needed to reach the station from the point of the route P2.

The unit 8 is conveniently configured to provide in output the route P2 only in the positive case, i.e. in particular if the distance of the charging station is smaller than the relative predetermined threshold. In fact, vice versa, the route P2 would become particularly inconvenient with respect to the route P1. In other words, the fun added by the route P2 would be completely spoiled from the problem of having an excessive deviation to reach the charging station.

The charging station may for example be an electric charging station or a refuelling station.

From what can be inferred above, providing the calculated route P2 is completely optional and not necessary. In any case, the unit 8 could also provide the route P2 under any circumstance.

Preferably, the unit 8 is configured to assign a first and respectively a second value of the aforementioned cost parameter to the route P2 and to the route P1. In this way, the routes P1, P2 can be compared according to the same yardstick.

Specifically, the unit 8 provides in output the route P2 only if the first value fulfils a predetermined relationship with the second value. The relationship is such that the route P2 is not excessively inconvenient with respect to the route P1.

For example, the relationship is fulfilled if the second value is smaller than the first value increased by means of a mathematical operation as a function of a predetermined coefficient, for example by multiplying the first value by the coefficient or by adding the coefficient to the first value.

The coefficient can be determined arbitrarily by the unit 8, for example based on an appropriate criterion, or set by the driver, for example via the commands 7.

In the case where the cost parameter is for example the duration of the routes P1, P2, the unit 8 could check whether the route P2 has a shorter duration than that of the route P1 increased by a certain percentage portion thereof, for example 20% more than the duration of the route P1. Here, the first value can be increased by multiplying it by 1.2 or by adding the first value to itself multiplied by 0.2. The same reasoning can be clearly applied in general, specifically also when the cost parameter is for example the length of the route or the residual range to be used or a combination of these.

Alternatively or additionally, the unit 8 could subject the optimization of the target function to constraints, for example to a constraint establishing that the first value fulfils the predetermined relationship with the second value directly in the step of calculation of the route P2.

In particular, in the first example, the constraint can be applied or fulfilled by removing from the graph the routes such that the predetermined relationship would not be fulfilled. Similarly, in the second example, the constraint can be applied or fulfilled by discarding the routes such that the predetermined relationship would not be fulfilled.

Preferably, for the calculated route P2 optionally provided in output, the unit 8 calculates the value of the overall fun index. The latter is an optimum value since it results directly from the optimization of the target function, the result of which is the calculated route P2.

Conveniently, the unit 8 is configured to associate the optimum value of the fun index or the calculated route P2 to a category among a plurality of fun categories, where each of the fun categories corresponds to a respective value or range of the fun index.

For example, the fun categories may be represented by a label, specifically virtual, or identifying, in particular defined by a number or a string such as "boring," "panoramic," "fun," "exhilarating," and the like.

In other words, the unit 8 assigns the corresponding category to the optimum value and consequently to the route P2.

In particular, the unit 8 stores the route P2 in association with or together with the respective relevant category.

In this way, the unit 8 can provide, for example the driver, specifically via the screen 5, with an item of information on the association or correspondence between the route P2 and the respective relevant category.

In general, the information that can be provided by the unit 8 can be provided in many ways to the driver or to the passengers, for example by means of sounds, signs, letters, images, etc. emitted by means of appropriate parts of the device 4.

By storing the route P2 between the departure point S and the arrival point Y, the unit 8 no longer needs to have to recalculate the same route P2 each time the driver enters the information relating to the points S, Y. On the contrary, the unit 8 is already ready to provide the route P2, specifically in association with the relevant category, which can be communicated to the driver.

Based on the fun categories, for example, the unit 8 can calculate optimum driving routes based on the fun index, in a manner analogous to the calculation of the route P2, for each or some of the categories by correspondingly setting the target functions such that the latter stray away from their respective optimum values when the fun index indicates the deviation of the level of fun from target levels corresponding to the fun categories.

In particular, the target functions strays away from optimum when the values of the overall fun index fall outside the respective values or ranges corresponding to the fun categories involved. The ranges can therefore be considered as target ranges. This can be set for example by penalty contributions as already explained earlier in this description.

More precisely, the target functions stray away more, in particular to a greater extent, from their optimum values when the fun index, in particular the overall fun index, lies out of the target ranges with respect to when the same fun index assumes any value within the target ranges.

The latter concept can be applied in general, that is also regardless of the fun categories, whenever a target range is defined for the fun index.

Alternatively, in case the unit 8 had calculated a plurality of alternative routes based on known methods, the unit 8 can still catalogue again the alternative routes based on the fun index by assigning the routes to the fun categories. In particular, a route already calculated may be associated with a fun category when the value of the overall fun index falls within the relevant value or range for the specific category.

Preferably, the unit 8 is configured to acquire a driver's feedback on the route P2 concerning the level of fun or the fun category of the route P2.

The unit 8 is also configured to re-associate the route P2 with a re-associated category among the fun categories based on the acquired feedback, as well as to store the route P2 in association with the re-associated category.

For example, if the driver should think afterwards that the followed route P2 belonged to or could be associated with a different fun category than that associated with the unit 8 automatically, the driver can enter his feedback, in particular via the commands 7, for example indicating the re-associated category. In this way, the unit 8 takes into account the driver's feedback by re-associating the route P2 to the re-associated category chosen by the driver.

From the above, the device 4 or the unit 8 carries out a method, specifically implemented on a computer, to calculate the route P2. The method comprises the steps of a. acquiring information corresponding to a departure place of the motor vehicle and to a target destination, b. determining the map 6 comprising the departure point S and the arrival point Y of the route P2 associated with the departure place and with the destination, respectively, c. calculating the route P2 on the map 6 from the departure point S to the arrival point Y by solving a path planning problem comprising an optimization of a target function depending on at least one first scalar parameter defined by a fun index, and d. providing the calculated driving route.

Like for example derivable from the operation of the unit 8, step d. is entirely optional. In other words, the actual execution of step d. depends on the fulfilment of one or more conditions.

In addition, the method preferably comprises one or more of the following steps e. calculating a shortest path on the map 6 from the departure point S to the arrival point Y as solution of a minimization of a cost function comprising a cost parameter that can be assigned to the shortest path and to the route P2, the cost parameter being different from the fun index and, for example, being defined by a duration, a length, a residual range to be used, or a linear combination of two or all of duration, length and residual range to be used, and f. determining a current residual range of the motor vehicle 1.

According to one example, the method further comprises the step of g. estimating whether the current residual range is sufficient to cover the shortest path, wherein step c or step d. is carried out when step g. has a negative outcome, or more precisely wherein step c or step d. is carried out only when step g. has a negative outcome.

Alternatively or additionally, the method may further comprise the steps of h. estimating whether the current residual range is sufficient to cover the driving route P2, i. determining whether there is at least one point on the route P2 from which a residual range charging station on the map 6 has a distance, for example in terms of time or space, smaller than a predetermined threshold when step g. has a negative outcome or only when step g. has a negative outcome, wherein step d. is carried out when step i. has a positive outcome, or more precisely only when step i. has a positive outcome.

Alternatively or additionally, the method may further comprise the steps of j. assigning a first value of the cost parameter to the driving route P2, k. assigning a second value of the cost parameter to the shortest path, and preferably
l. determining whether the first value fulfils a predetermined relationship with the second value,
   wherein step d. is carried out when step 1. has a positive outcome, or more precisely only when step 1. has a positive outcome.

In addition, the method may additionally comprise the steps of
m. acquiring the driver's feedback on the route P2 concerning the level of fun of the route P2,
n. re-associating the route P2 with a re-associated category among the fun categories based on the acquired feedback, and
o. storing the route P2 in association with the re-associated category.

From the above, the advantages of the device 4 and of the method according to the invention are evident.

The calculation of the route P2 provides the driver with a valid alternative to the typical shortest path based on the particular criterion of the driving pleasure.

The calculation of the route P2 takes into account the goodness of the route P2 in terms of length and duration, thus achieving an excellent compromise between fun and efficiency.

In addition, the unit 8 proposes the route P2 to the driver only in cases where the difference between the route P2 and the shortest path is insignificant, for example since the shortest path still requires a stop to increase the residual range of the motor vehicle 1.

Finally, it is clear that modifications and variants can be made to the device 4 and to the method according to the invention, without, however, departing from the scope of protection defined by the claims.

The invention claimed is:

1. A computer implemented method to calculate a driving route (P2) to be followed by a motor vehicle (1), the method comprising the steps of
   a. acquiring information corresponding to a departure place of the motor vehicle and to a target destination,
   b. determining a road map (6) comprising a departure point(S) and an arrival point (Y) of the driving route (P2) associated with the departure point and with the destination, respectively,
   c. calculating the driving route (P2) on the road map (6) from the departure point (S) to the arrival point (Y) by solving a path planning problem comprising an optimization of a target function depending on at least one first scalar parameter defined by a fun index,
   d. providing the calculated driving route (P2),
   e. calculating a shortest path (P1) on the road map (6) from the departure point (S) to the arrival point (Y) as a solution for minimization of a cost function comprising a cost parameter that can be assigned to the shortest path and to the driving route (P1, P2), the cost parameter being different from the fun index,
   f. determining a current residual range of the motor vehicle (1), and
   g. estimating whether the current residual range is sufficient to cover the shortest path (P1),
   wherein step d or step c. and step d. are carried out only when step g. has a negative outcome,
   wherein the fun index is indicative of a level of fun of the driving route (P2) increasing with at least one or any combination of
      a first quantity positively correlated with lateral accelerations of the motor vehicle (1) expected along the driving route (P2),
      a second quantity positively correlated with front accelerations of the motor vehicle (1) expected along the driving route (P2),
      a third quantity positively correlated with slope variations expected along the driving route (P2),
      fourth quantity negatively correlated with decelerations of the motor vehicle (1) expected along the driving route (P2), and
      a fifth quantity negatively correlated with transits through urban sections or centres expected along the driving route (P2),
   wherein the target function strays away from an optimum value of the target function, when the fun index indicates a deviation of the level of fun from a target level or a decrease in the level of fun, the optimum value of the target function corresponding to the solution of the path planning problem.

2. The method according to claim 1, wherein the target function has one or more optimization variables, whose respective values are suited to determine the driving route (P2) and correspond to at least one value of the fun index in the target function, so that the path planning problem is solved by respective optimum values of the optimization variables corresponding to the driving route (P2), and to an at least one optimum value of the fun index associated with the driving route (P2) and optimizing the target function.

3. The method according to claim 1, further comprising the steps of
   h. estimating whether the current residual range is sufficient to cover the driving route (P2),
   i. determining whether there is at least one point of the driving route (P2) from which a residual range charging station on the road map (6) has a distance, for example in terms of time or space, smaller than a predetermined threshold when step g. has a negative outcome,
   wherein step d. is carried out when step i. has a positive outcome.

4. The method according to claim 1, further comprising the steps of
   j. assigning a first value of the cost parameter to the driving route (P2),
   k. assigning a second value of the cost parameter to the shortest path (P1).

5. The method according to claim 4, comprising the step of
   l. Determining whether the first value fulfils a predetermined relationship with the second value,
   wherein step d. is carried out when step 1. has a positive outcome.

6. The method according to claim 4, wherein the optimization of the target function is subjected to a constraint establishing that the first value fulfils a predetermined relationship with the second value.

7. The method according to claim 1, wherein the target function further depends on a second parameter indicative of a duration, a length or a residual range to be used expected for the driving route (P2), so that the target function strays away from the optimum value of the target function when the second parameter indicates an increase in the duration, the length or the residual range to be used expected for the driving route (P2).

8. The method according to claim 2, wherein the optimum value of the fun index is associated with a respective category of a plurality of fun categories corresponding to respective values or ranges of the fun index, so that the driving route (P2) is stored in association with the respective category, so that an item of information on the stored driving route and on the respective category can be provided.

9. The method according to claim 8, comprising the steps of
   m. acquiring a driver's feedback on the driving route (P2) concerning the level of fun of the driving route (P2), and
   n. re-associating the driving route (P2) with a re-associated category among the fun categories based on the acquired feedback, and
   o. storing the driving route (P2) in association with the re-associated category.

10. The method according to claim 1, wherein the target function strays away from the optimum value of the target function to a greater extent when the fun index lies out of a target range compared to when the fun index takes on any value within the target range.

11. A device for calculating driving routes (4) comprising means (8) for carrying out the method according to claim 1.

12. A navigation system for a motor vehicle (1), the navigation system comprising the device (4) according to claim 11.

13. The method according to claim 1, wherein the cost parameter is defined by a duration, a length, a residual range to be used, or a linear combination of two or all of duration, length and residual range to be used.

14. A computer implemented method to calculate a driving route (P2) to be followed by a motor vehicle (1), the method comprising the steps of
   a. acquiring information corresponding to a departure place of the motor vehicle and to a target destination,
   b. determining a road map (6) comprising a departure point(S) and an arrival point (Y) of the driving route (P2) associated with the departure point and with the destination, respectively,
   c. calculating the driving route (P2) on the road map (6) from the departure point(S) to the arrival point (Y) by solving a path planning problem comprising an optimization of a target function depending on at least one first scalar parameter defined by a fun index,
   e. calculating a shortest path (P1) on the road map (6) from the departure point(S) to the arrival point (Y) as a solution for minimization of a cost function comprising a cost parameter that can be assigned to the shortest path and to the driving route (P1, P2), the cost parameter being different from the fun index,
   f. determining a current residual range of the motor vehicle (1), and
   g. estimating whether the current residual range is sufficient to cover the shortest path (P1),
   wherein step c. is carried out only when step g. has a negative outcome,
   wherein the fun index is indicative of a level of fun of the driving route (P2) increasing with at least one or any combination of
   a first quantity positively correlated with lateral accelerations of the motor vehicle (1) expected along the driving route (P2),
   a second quantity positively correlated with front accelerations of the motor vehicle (1) expected along the driving route (P2),
   a third quantity positively correlated with slope variations expected along the driving route (P2),
   a fourth quantity negatively correlated with decelerations of the motor vehicle (1) expected along the driving route (P2), and
   a fifth quantity negatively correlated with transits through urban sections or centres expected along the driving route (P2),
   wherein the target function strays away from an optimum value of the target function, when the fun index indicates a deviation of the level of fun from a target level or a decrease in the level of fun, the optimum value of the target function corresponding to the solution of the path planning problem.

* * * * *